(No Model.)
H. BLUMENBERG, Jr.
TRANSFORMING POTENTIAL ENERGY OF CARBON INTO ELECTRICAL ENERGY.
No. 599,094. Patented Feb. 15, 1898.
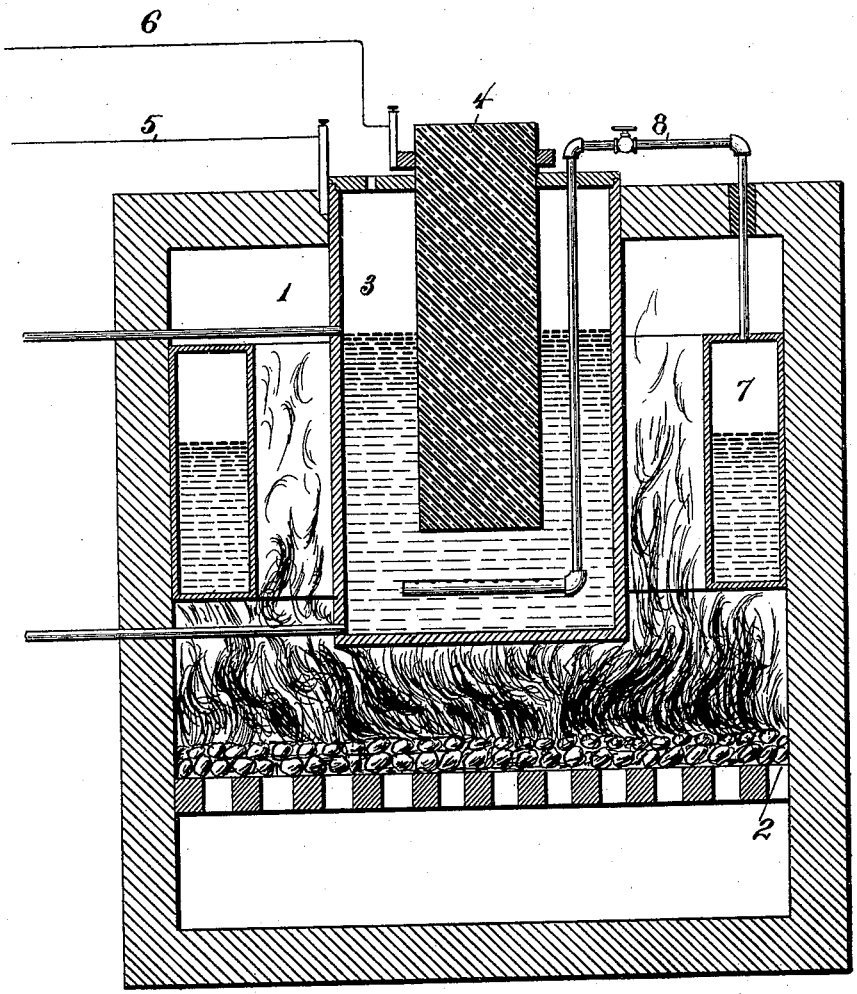
Witnesses
Inventor
Henry Blumenberg Jr
by Fenelon B. Brock
Attorney

UNITED STATES PATENT OFFICE.

HENRY BLUMENBERG, JR., OF NEW YORK, N. Y.

TRANSFORMING POTENTIAL ENERGY OF CARBON INTO ELECTRICAL ENERGY.

SPECIFICATION forming part of Letters Patent No. 599,094, dated February 15, 1898.

Application filed April 7, 1896. Serial No. 586,597. (No model.)

*To all whom it may concern:*

Be it known that I, HENRY BLUMENBERG, Jr., a citizen of the United States, residing at New York city, in the State of New York, have invented certain new and useful Means for Transforming the Potential Energy of Carbon into Electrical Energy; and I do declare the following to be a full, clear, and exact description of the invention, such as will enable others skilled in the art to which it appertains to make and use the same.

In the conversion of the potential energy of carbon or carbonaceous material or compounds into electricity by combining oxygen therewith through a fused electrolyte I have found that steam, preferably superheated, is admirably suited for supplying an excess of oxygen to the fused electrolyte. For the purpose of holding the oxygen within the electrolyte either chemically or mechanically I have found that a fused electrolyte, consisting of lime, cryolite, and caustic soda, gives excellent results when various metallic oxids or oxygen-bearing compounds are contained therein and steam is injected when the electrolyte is fused. The position taken or assumed by the metallic oxids or oxygen-bearing compounds seems to be the following: They give up part of their oxygen to the carbon, or, in other words, combine with the carbon, forming carbonic oxid or carbonic dioxid, as the conditions will permit. They then seem to absorb or combine with the oxygen produced from the decomposed steam. I do not here state that all the oxygen consumed by the carbon comes or is taken from the metallic oxids or oxygen-bearing compounds; quite the contrary. I know that large quantities of oxygen combine directly with the carbon. The oxygen produced by the decomposition of steam injected into the electrolyte combines partially with the carbon and partially with the metallic oxids or oxygen-bearing compounds. The oxygen-bearing compounds or metallic oxids act only as safeguards or carriers, namely: When the necessary amount of oxygen is not in the electrolyte, it will be absorbed from the metallic oxid or oxygen-bearing compounds by the carbon, thereby reducing them to lower oxids, and probably, if the heat is high enough to fuse metals, they will oxidize the moment the electrolyte is subjected to steam which is injected and is decomposed into oxygen, hydrogen, &c.

I wish to state that nearly all the oxids of metals can be used; also, some of the chlorids, like copper, oxychlorid, and subchlorid; also, all the salts which form oxids, suboxids, and peroxids when heated; also, nearly all the salts which will absorb oxygen when heated. The fused electrolyte, bath, or conveyer can be almost any of the haloid salts of the metals of the alkali or alkaline earth, although I prefer the nitrates or hydrates of the alkalies. They appear to be best suited for the purpose. An especially good conveyer is a compound of lime, cryolite, and caustic soda, as previously noted. In this conveyer can be placed the metallic oxid or oxygen-bearing compound, such as barium or manganese oxid, or a combination of the two.

When the electrolyte has been fused, steam, preferably superheated, is blown through or injected through the fused electrolyte and the steam is thereby decomposed into oxygen and hydrogen gas. When the necessary amount of oxygen gas is liberated by the decomposition of the steam in contact with the fused electrolyte and heated carbon and the same then combines through the intervening fused electrolyte, I can convert a large portion of potential energy of carbon or carbonaceous material or compounds into electrical energy.

An exemplified apparatus may consist of a combustion-chamber 1, in which there is a grate or burner 2, designed for heating the chamber, and an electrolyte-containing pot 3, preferably of either cast-iron or copper. An anode 4, of carbon or carbonaceous material, is placed in this pot, care being taken that the anode is not in contact therewith, to prevent short-circuiting. The electrolyte, bath, or conveyer and the oxygen-bearing compound are also placed in the pot. One of the conductors 5 is attached to the pot and the other conductor 6 to the anode 4, preference being had not to introduce the steam until after the conveyer is fused. The steam may be introduced from any suitable generator; but I prefer to provide a jacket 7 or other suitably-shaped reservoir within the combustion-chamber 1, in which steam is generated. 8 indicates a steam-pipe leading from the jacket 7, preferably into the bottom of the pot 3.

The carbon will when heated combine with oxygen, forming carbonic oxid or dioxid, as conditions will permit. The injection of superheated steam to all appearances decomposes into oxygen and hydrogen and at the same time agitates the fused electrolyte, thereby increasing the electrical energy.

As an oxygen-bearing compound I have used the natural ores in lieu of the oxygen-bearing compounds previously referred to. If the temperature of the electrolyte be raised sufficiently, the metals from the ores may be reduced at the same time the electrical energy is produced and at one and the same operation. Care should be taken that the ore does not choke or clog the electrolyte or that the reduced metal will not short-circuit the carbon anode with the pot. In this double continuous operation the metal is tapped from the electrolyte at intervals. The superheated injected steam is here continuously introduced after the electrolyte is fused. Of course this is only applicable to such ores as are easily reduced.

I have found that in using a hydrate or nitrate of an alkali for a fused bath, electrolyte, or conveyer in which the oxygen-bearing salt is the oxychlorid or subchlorid of copper, the electrolyte-containing pot should be of copper, because better results are obtained electrically, especially in electromotive force—that is to say, a higher voltage is obtained.

The word "carbon" in the claims is intended to embrace all carbon or carbonaceous material.

In using the metallic oxids or oxygen-bearing compounds I have noticed that if enough surface is given by the electrolyte, bath, or conveyer which contains the above-named metallic oxids or oxygen-bearing compounds to the air large quantities of oxygen seem to be absorbed from the surrounding atmosphere. This is especially noticeable if we use copper oxychlorid, or subchlorid, or barium oxid, or barium hydrate. The last-named chemical is on heating transformed into the oxid. The bath, electrolyte, or conveyer in this case can be preferably an alkaline hydrate or nitrate.

I place a water-heating chamber within the furnace and lead a pipe therefrom into the electrolytic cell, by means of which the furnace is made to generate the superheated steam and force it into the electrolyte.

I claim—

1. The herein-described improvement in the art, for converting the potential energy of carbon or carbonaceous material or compounds into electrical energy which consists in chemically combining carbon and oxygen by injecting steam through an interposed electrolyte consisting of a fused bath composed of one or more of the fusible salts of the alkali metals or alkali-earth metals and an added oxidizing agent.

2. The herein-described improvement in the art, for converting the potential energy of carbon or carbonaceous material or compounds into electrical energy which consists in chemically combining carbon and oxygen by injecting superheated steam through an interposed electrolyte consisting of a fused bath composed of one or more of the fusible salts of the alkali metals or alkali-earth metals and an added oxidizing agent.

3. The herein-described improvement in the art, for converting the potential energy of carbon or carbonaceous material or compounds into electrical energy which consists in chemically combining carbon and oxygen through an interposed fused electrolyte consisting of lime, cryolite and caustic soda, and an oxidizing agent.

4. The herein-described improvement in the art, which consists in converting the potential energy of carbon or carbonaceous material or compounds into electrical energy by chemically combining carbon and oxygen through an interposed fused electrolyte consisting of lime, cryolite, caustic soda, and baryta or manganese oxids.

5. The herein-described improvement in the art, which consists in converting the potential energy of carbon or carbonaceous materials or compounds into electrical energy by chemically combining carbon and oxygen, through an intervening electrolyte consisting of a fused bath composed of one or more of the haloid salts of the alkali metals or alkali-earth metals and an added oxidizing agent subjecting water to an elevated temperature, thereby converting it into steam and injecting such steam into the fused electrolyte.

6. The herein-described generator consisting of a furnace, one or more cells therein containing an electrolyte, a water-chamber therein, (such as a steam-boiler,) a pipe leading from the said chamber into the fused electrolyte.

7. The herein-described improvement in the art, which consists in converting the potential energy of carbon or carbonaceous material or compounds into electrical energy, by combining carbon and oxygen through an interposed electrolyte, to which an oxygen-bearing compound has been added.

8. The herein-described improvement in the art, which consists in converting the potential energy of carbon or carbonaceous material or compounds into electrical energy by combining chemically carbon and oxygen through an interposed fused electrolyte in a suitable furnace, introducing and reducing to oxygen-bearing ore with carbon or without as the carbon is needed, to the electrolyte, at the same time the electrical energy is produced and conveying away the fused metal and the electrical energy.

9. The herein-described improvement in the art, which consists in converting the potential energy of carbon or carbonaceous material or compounds into electrical energy by forcing or injecting steam preferably superheated into a fused electrolyte in which carbon, metallic oxids or oxygen-bearing compounds are suspended or dissolved, the steam being thereby decomposed into its respective elements.

10. The herein-described improvement in the art, which consists in forcing or injecting steam preferably superheated into a fused electrolyte to which an oxygen-bearing compound has been added containing carbon, thereby decomposing the steam into its respective elements.

11. The herein-described improvement in the art, which consists in forcing or injecting steam preferably superheated into a fused electrolyte containing metallic oxids or oxygen-bearing compounds, thereby decomposing steam into its respective elements.

12. The herein-described improvement in the art, which consists in placing metallic oxids or oxygen-bearing compounds in a fused electrolyte to act as carriers for gases such as oxygen which is taken up by them from the surrounding atmosphere or from the steam which is injected into the electrolyte.

13. The herein-described improvement in the art, which consists in converting the potential energy of carbon or carbonaceous material into electrical energy by chemically combining carbon and oxygen through an interposed fused electrolyte consisting of an alkaline hydrate to which an oxygen-bearing compound has been added, and subjecting the fused electrolyte to steam.

14. The herein-described improvement in the art, which consists in converting the potential energy of carbon or carbonaceous material into electrical energy by chemically combining carbon and oxygen, injecting steam preferably superheated through a fused electrolyte consisting of a haloid salt or metals of the alkali or alkaline earths.

15. The herein-described improvement in the art, which consists in converting the potential energy of carbon or carbonaceous material into electrical energy by chemically combining carbon and oxygen through an intervening fused electrolyte consisting of one or more of the fusible salts of the alkali metals or alkali-earth metals in which there are chemically dissolved or mechanically suspended metallic oxids or oxygen-bearing compounds.

16. The herein-described improvement in the art, which consists in converting the potential energy of carbon or carbonaceous material into electrical energy by chemically combining carbon and oxygen through an intervening fused electrolyte in which there are chemically dissolved or mechanically suspended such salts which will on heating either absorb or give up gases, such as oxygen, and by injecting steam into said electrolyte during such conversion.

17. The herein-described improvement in the art, which consists in converting the potential energy of carbon or carbonaceous material into electrical energy by chemically combining carbon and oxygen through an intervening fused electrolyte in which there are chemically combined or mechanically suspended such salts as will on heating transform into metallic oxids or oxygen-bearing compounds and by the injection of superheated steam into said electrolyte.

18. The herein-described generator consisting of a furnace, a copper cell therein containing an electrolyte, a water-chamber therein, and a pipe leading from said chamber into the electrolyte.

19. The herein-described generator consisting of a furnace, a metallic cell containing an electrolyte, a water-chamber therein located outside the electrolyte, and a pipe leading from said chamber into the electrolyte.

20. The herein-described improvement in the art, which consists in converting the potential energy of carbon or carbonaceous material into electrical energy by chemically combining carbon and oxygen through an intervening fused electrolyte contained in a copper cell, in which there is chemically combined or mechanically suspended copper oxychlorid or subchlorid, and then injecting steam into such fused electrolyte.

21. The herein-described improvement in the art of converting the potential energy of carbon or carbonaceous materials into electrical energy, which consists in chemically combining carbon and oxygen by injecting an oxygen-bearing fluid through an interposed electrolyte consisting of a fused bath composed of one or more of the fusible salts of the alkali metals, or alkali-earth metals, and an added oxidizing agent.

In testimony whereof I affix my signature in the presence of two witnesses.

HENRY BLUMENBERG, JR.

Witnesses:
FREDK. OVERBURY,
W. T. WILSON.